(12) United States Patent
Lehtiniemi et al.

(10) Patent No.: US 12,450,396 B2
(45) Date of Patent: Oct. 21, 2025

(54) DEVICE SHARING

(71) Applicant: Nokia Technologies Oy, Espoo (FI)

(72) Inventors: Arto Juhani Lehtiniemi, Tampere (FI); Miikka Tapani Vilermo, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 155 days.

(21) Appl. No.: 18/329,970

(22) Filed: Jun. 6, 2023

(65) Prior Publication Data
US 2023/0334183 A1     Oct. 19, 2023

(30) Foreign Application Priority Data

Jun. 14, 2022   (EP) .................................... 22178927

(51) Int. Cl.
*G06F 21/00*   (2013.01)
*G06F 3/14*    (2006.01)
*G06F 21/32*   (2013.01)
*G06F 21/62*   (2013.01)

(52) U.S. Cl.
CPC .............. *G06F 21/629* (2013.01); *G06F 3/14* (2013.01); *G06F 21/32* (2013.01); *G06F 2221/2141* (2013.01)

(58) Field of Classification Search
None
See application file for complete search history.

(56) References Cited

U.S. PATENT DOCUMENTS

| | | | |
|---|---|---|---|
| 9,134,904 B2 * | 9/2015 | Do | G06F 3/04886 |
| 2008/0192059 A1 * | 8/2008 | Kennedy | G06F 3/0488 |
| | | | 715/792 |
| 2009/0094561 A1 | 4/2009 | Do et al. | |
| 2009/0106667 A1 * | 4/2009 | Lyle | G06F 3/147 |
| | | | 715/750 |
| 2012/0303476 A1 * | 11/2012 | Krzyzanowski | G06F 16/00 |
| | | | 705/26.61 |

(Continued)

FOREIGN PATENT DOCUMENTS

| | | |
|---|---|---|
| KR | 20160090083 A | 7/2016 |
| WO | 2015/005959 A1 | 1/2015 |

OTHER PUBLICATIONS

"Xiaomi patents full-screen fingerprint scanner for future smartphones", techradar, Retrieved on May 24, 2023, Webpage available at : https://www.techradar.com/news/xiaomi-patents-full-screen-fingerprint-scanner-for-future-smartphones.
Jea et al., "A minutia-based partial fingerprint recognition system", Pattern Recognition, vol. 38, No. 10, Oct. 2005, pp. 1672-1684.

(Continued)

*Primary Examiner* — Maung T Lwin
(74) *Attorney, Agent, or Firm* — ALSTON & BIRD LLP (57) ABSTRACT

Examples of the disclosure relate to sharing a device between two or more authenticated users. In examples of the disclosure an apparatus is configured to enable a first user to access one or more applications of a device. The apparatus can then enable authenticating a second user and enable the second user to access one or more functions of at least one application. The apparatus can also detect one or more peripheral devices associated with the second user and configure the apparatus to provide outputs to and/or receive inputs from the one or more peripheral devices associated with the second user. The outputs and/or inputs relate to the one or more functions to which access has been enabled for the second user.

19 Claims, 5 Drawing Sheets

(56) References Cited

U.S. PATENT DOCUMENTS

2014/0002389 A1\* 1/2014 Kim .................. H04N 21/43615
                                                                                     345/1.3
2022/0224681 A1\* 7/2022 Gosalia ................. H04W 12/06

OTHER PUBLICATIONS

"The World's First Full-Screen Fingerprint Reader for LCD Screens is Ready", gizchina, Retrieved on May 24, 2023, Webpage available at : https://www.gizchina.com/2020/07/21/the-worlds-first-full-screen-fingerprint-reader-for-lcd-screens-is-ready/.
"Huawei Working Hard to Overcome Full-Screen Fingerprint Recognition Technology", gizchina, Retrieved on May 24, 2023, Webpage available at : https://www.gizchina.com/2020/08/17/huawei-working-hard-to-overcome-full-screen-fingerprint-recognition-technology/.
"Apple's Face ID: No match for multifactor security", TechBeacon, Retrieved on May 24, 2023, Webpage available at : https://techbeacon.com/security/apples-face-id-no-match-multifactor-security.
Extended European Search Report received for corresponding European Patent Application No. 22178927.4, dated Nov. 10, 2022, 11 pages.

\* cited by examiner

DEVICE SHARING

TECHNOLOGICAL FIELD

Examples of the disclosure relate to device sharing. Some relate to sharing a device between two or more authenticated users.

BACKGROUND

Situations exist where more than one user would like to use a single device simultaneously. To enable this the device must be able to switch between single user and multi-user modes.

BRIEF SUMMARY

According to various, but not necessarily all, examples of the disclosure there may be provided an apparatus comprising means for:
- enabling a first user to access one or more applications of a device;
- authenticating a second user;
- enabling the second user to access one or more functions of at least one application;
- detecting one or more peripheral devices associated with the second user; and
- configuring the apparatus to provide outputs to and/or receive inputs from the one or more peripheral devices associated with the second user wherein the outputs and/or inputs relate to the one or more functions to which access has been enabled for the second user.

Detecting the one or more peripheral devices associated with a second user may comprise accessing a storage means comprising a record of one or more peripheral devices associated with the second user and identifying one or more peripheral devices in the record that are within a threshold distance of the device.

One or more biometric parameters of the second user may be used to authenticate the second user.

The second user may have restricted authorisation for the one or more applications compared to the first user.

The means may be for enabling a first user to access a first application and a second application and, after the second user has been authenticated, enabling the second user to access the first application but not to access the second application.

The means may be for, after the second user has been authenticated, configuring the device to provide a first user interface for the first user and a second, different user interface for the second user.

The first user interface may comprise one or more user interface elements configured to enable the first user to control one or more peripheral devices associated with the first user and the second user interface comprises one or more user interface elements configured to enable the second user to control one or more peripheral devices associated with the second user.

The means may be for, after the second user has been authenticated, configuring the device to provide one or more shared user interface elements wherein the shared user interface elements are configured to enable the first user and the second user to control one or more peripheral devices associated with the second user.

The means may be for, after the second user has been authenticated, enabling display of data from one or more peripheral devices associated with the first user and data from one or more peripheral devices associated with the second user.

The means may be for, after the second user has been authenticated, enabling the second user to select which one or more peripheral devices are connected to the device.

After the second user has been authenticated, the one or more peripheral devices associated with the second user may be temporarily connected to the device.

After the second user has been authenticated, the one or more peripheral devices associated with the second user may be disconnected from the device when the at least one application is closed.

After the second user has been authenticated, the one or more peripheral devices associated with the second user may be disconnected from the device so that the outputs and/or inputs relating to the one or more functions to which access has been enabled are no longer received from and/or sent to the one or more peripheral devices.

The one or more functions which the second user is enabled to access may comprise at least one function accessible to the first user.

Authenticating the second user may comprise obtaining information relating to local peripheral devices to determine one or more candidate second users and comparing biometric information from the second user with stored biometric information relating to the candidate second users.

According to various, but not necessarily all, examples of the disclosure there may be provided a device comprising an apparatus as claimed in any preceding claim is at least one of: a telephone, a camera, a computing device, a teleconferencing apparatus.

According to various, but not necessarily all, examples of the disclosure there may be provided a method comprising:
- enabling a first user to access one or more applications of a device;
- authenticating a second user;
- enabling the second user to access one or more functions of at least one application;
- detecting one or more peripheral devices associated with the second user; and
- configuring the apparatus to provide outputs to and/or receive inputs from the one or more peripheral devices associated with the second user wherein the outputs and/or inputs relate to the one or more functions to which access has been enabled for the second user.

According to various, but not necessarily all, examples of the disclosure there may be provided a computer program comprising computer program instructions that, when executed by processing circuitry, cause:
- enabling a first user to access one or more applications of a device;
- authenticating a second user;
- enabling the second user to access one or more functions of at least one application;
- detecting one or more peripheral devices associated with the second user; and
- configuring the apparatus to provide outputs to and/or receive inputs from the one or more peripheral devices associated with the second user wherein the outputs and/or inputs relate to the one or more functions to which access has been enabled for the second user.

BRIEF DESCRIPTION

Some examples will now be described with reference to the accompanying drawings in which.

DETAILED DESCRIPTION

Sometimes it may be useful for more than one user to share a device 100. For example, two or more users could be participating in a conference call using a device 100 or two or more users might want to share information or there could be other circumstances in which it is useful to enable a plurality of users to share a single device 100. Examples of the disclosure enable a plurality of users to, at least temporarily, share the same device 100 to perform one or more functions.

Figure 1:
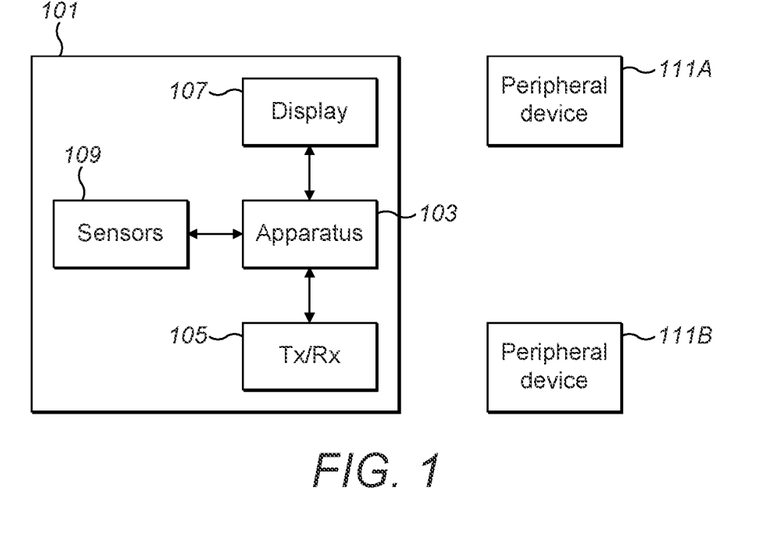
FIG. 1 shows an example device.

FIG. 1 schematically shows an example device 101 that could be used to implement examples of the disclosure. The device 101 could be a telecommunications device 101 such as a mobile phone, a camera, a computing device, a teleconferencing device, a virtual reality device, an augmented reality device or any other suitable type of device. The device 101 can be configured to provide outputs to and/or receive inputs from one or more peripheral devices 111.

The example device 101 comprises an apparatus 103, a transmitter/receiver 105, a display 107 and one or more sensors 111. Only components that are referred to in the following description are shown in FIG. 1. Additional components could be provided in some examples of the disclosure. For instance, the device 101 could comprise a power source, a tactile output device, a loudspeaker or any other suitable components.

Figure 10:
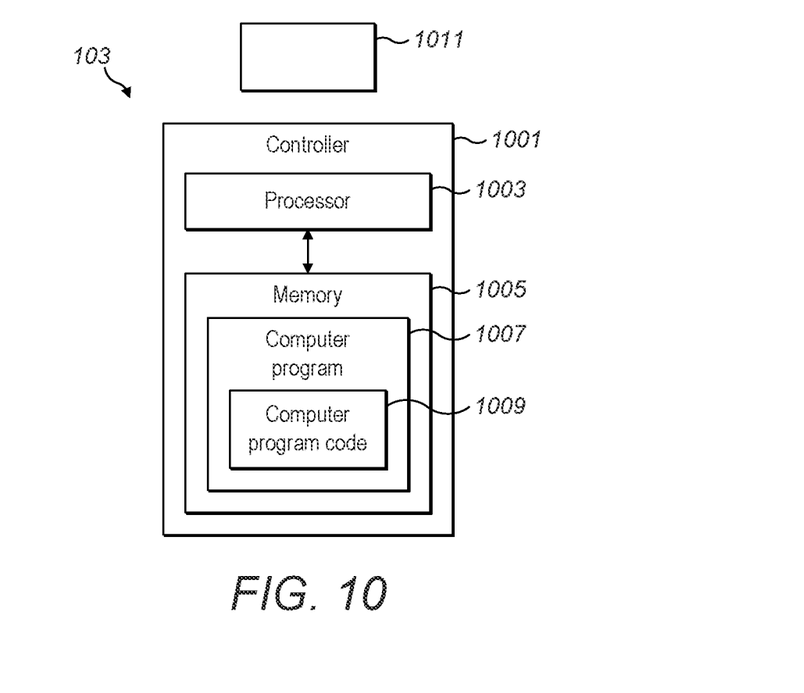
FIG. 10 shows an example apparatus.

The apparatus 103 can comprise a controller comprising a processor and memory. Examples of an apparatus 103 are shown in FIG. 10. The apparatus 103 can be configured to enable control of the device 101. For example, the apparatus 103 can be configured to control images that are displayed on the display 107 and/or the communications that are made using the transmitter/receiver 105.

The transmitter/receiver 105 can comprise any means that enables the device 101 to participate in communication sessions. The transmitter/receiver 105 can enable the device 101 to communicate in communications networks. The communications networks can be wired and/or wireless communications networks.

The transmitter/receiver 105 can be configured to enable communications between the device 101 and one or more peripheral devices 111. The communications between the device 101 and one or more peripheral devices 111 can be via wireless communication links. The wireless communication links could comprise short range communication links such as Bluetooth, Bluetooth Low Energy, Bluetooth Smart, 6LoWPan (IP$_v$6 over low power personal area networks) ZigBee, ANT+, near field communication (NFC) or any suitable type of communication link or combination of communication links.

The display 107 can comprise any means that can be configured to enable information to be displayed. In some examples the display 107 could be a touch sensitive display which could enable one or more users to make user inputs using the touch sensitive display.

The display 107 can be controlled by the apparatus 103 to display a user interface and/or any other suitable type of images. The user interface can comprise one or more user interface elements. The user interface elements can enable a user to interact with device 101 and/or one or more of the peripheral devices 111. The user interface elements can enable a user to control the device 101 and/or one or more peripheral devices 111.

The sensors 109 can comprise any means that can be configured to detect characteristics that can be used to authenticate users of the device 101. In some examples the sensors 109 could be configured to detect one or more biometric parameters such as fingerprints, facial images or any other biometric parameters that can be used to identify different users. For example, image sensors could be used to detect images of faces of users and/or infrared sensors could be used to detect fingerprints of users.

In some examples the sensors 109 could be embedded within other components of the device 101. For instance, one or more sensors 109 can be embedded within the display 107 or in any other suitable location within the device 101.

The device 101 can be configured to connect to any suitable number of peripheral devices 111. The device 101 can connect to a peripheral device 111 by establishing a communication link with the peripheral device so as to enable the peripheral device 111 to receive outputs from the communications device 101 and or provide inputs to the device 101. In the example of FIG. 1 two peripheral devices 111 are shown. The device 101 cane be configured to connect to both of the peripheral devices 111 at the same time and/or could connect to different peripheral devices 111 at different times.

In some examples the peripheral devices 111 can be configured to provide outputs to a user. For example, the peripheral devices 111 could comprise one or more displays or other means for providing visual outputs to a user. In some examples the peripheral devices 111 could comprise audio output means such as loudspeakers or ear pieces for providing audio outputs for a user. As examples, the peripheral devices 111 could comprise televisions, headsets, earphones, wearable devices such as smart watches, smart speakers of any other suitable type of device.

In some examples the peripheral devices 111 could comprise devices that can be configured to enable a user to make one or more inputs. For example, they could comprise smart speakers that could comprise one or more microphones that can enable a user to make audio inputs or they could comprise health tracking devices that could enable biometric data such as heart rate to be collected form the users or they could comprise any other type of input means or combinations of different types of input means.

Other types of peripheral devices 111 could be used in other examples.

In examples of the disclosure the peripheral devices 111 can be associated with different users. For instance, the first peripheral device 111A could be associated with a first user and the second peripheral devices 111B could be associated with a second user. The first user could be the owner or primary user of the device 101 while the second user could be a different user who is not the owner or primary user of the device 101. Examples of the disclosure can be used to enable the device 101 to connect to peripheral devices 111 associated with different users.

Figure 2:
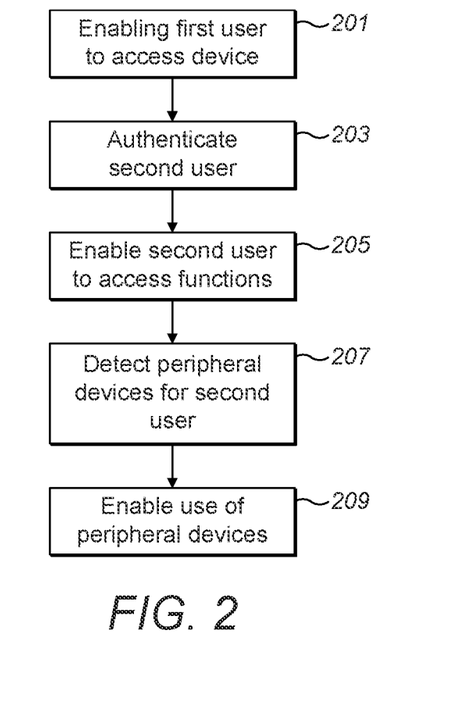
FIG. 2 shows an example method.

FIG. 2 shows an example method. The method could be implemented using a device 100 as shown in FIG. 1 and/or using an apparatus 103 as shown in FIGS. 1 and 10 and/or by any other suitable means. The method can be used to share a device 101 with different users.

The method comprises, at block 201 enabling a first user to access one or more applications of a device 101. The device 101 could be a telecommunications device such as a mobile phone or could be any other suitable device or type of device.

The first user can be authenticated prior to the to the first user being granted access to the one or more applications of the device 101. In some cases, the first user might be authenticated before any of the functions can be accessed. For instance, the first user might need to be authenticated to turn the device 101 on and/or to unlock the device 101.

Any suitable means or combinations of means can be used to authenticate the first user. In some examples the one or more sensors 109 of the device 100 could be configured to detect biometric parameters of the first user that can be used to identify the first user. For example, the sensors 109 could be configured to detect the first user's fingerprint or capture an image of the user's face that could be used for facial recognitions. In some examples the authentication could comprise the user entering a password or other similar identification process.

The applications of the device 101 can enable the device 101 to perform one or more functions. The functions that are performed can depend upon the type of device 100. For instance, a communications device 101 could comprise different applications that enable different types of communications. The types of communications could be voice calls, video calls, text communications or any other types of communications. Other functions could be performed in other applications.

When a user is accessing an application of the device 101 the display 107 can be configured to display a user interface. The user interface can comprise one or more user interface elements that enable a user to control respective functions of the application.

In some examples the device 101 could be connected to one or more peripheral devices 111. The peripheral devices 111 could be associated with the first user. The peripheral devices 111 could be associated with the first user in that there could be a record stored that indicates which of the peripheral devices 111 belong to or are otherwise associated with the first user. The record could be stored locally to the device 101 or it could be stored at a remote location that can be accessed by the device 101. The peripheral devices 111 that are associated with the first user can be automatically connected to the device 101. For instance, a user can update a stored record to indicate the peripheral devices 111 that are associated with them and these can be accessed automatically by the device 101 without any further authentication.

At block 203 the method comprises authenticating a second user. The second user can be a different user to the first user. The first user can be the owner or registered user of the device 101 while the second user might be a different user who is not the owner or registered user of the device 100.

Any suitable means can be used to authenticate the second user. For instance, the second user could be authenticated by one or more biometric parameters that can be detected using the sensors 109 of the device 101. The second user could be authenticated using a fingerprint, facial recognition or any other suitable means.

In some examples the device 101 can access a storage means comprising identification data relating to the second user so as to enable the second user to be authenticated. The storage means could be at a remote location that can be accessed by the device 101.

At block 205, if the second user has been successfully authenticated, the device 101 enables the second user to access one or more functions of at least one application. In some examples the one or more functions which the second user is enabled to access comprise at least one function that is also accessible to the first user. In other examples the one or more functions could comprise functions that are different to the functions or application currently being used by the first user.

When the second user can access the one or more functions of the device the device 101 can be configured to receive inputs from or provide outputs to the second user. For instance, the user interface displayed on the display 107 could be configured to display information and/or user interface elements specifically for the second user. Other types of input and/or output could be used in other examples of the disclosure.

The second user might have restricted authorisation to the applications of the device 101 compared to the first user. For example, the first user might be authorised to access any of the applications of the device 101 while the second user only has access to a subset of the applications. For instance, the second user might only be authorised to access the application or applications that were being used when the second user was authenticated. In some examples the first user could indicate which applications the second user can be authorised to access.

In some examples the device 101 can be configured to enable the first user to access a first application and a second application and, after the second user has been authenticated, the device 101 can enable the second user to access the first application but not to access the second application.

At block 207 the method comprises detecting one or more peripheral devices 111 associated with the second user. The peripheral devices 111 can be associated with the second user in that there could be a record stored that indicates which of the peripheral devices 111 belong to or are otherwise associated with the second user. The peripheral devices 111 that are associated with the second user may have no pre-established connection with the device 101.

Any suitable means can be used to detect the peripheral devices 111 associated with the second user. For instance, the device 101 can be configured to discover peripheral devices in the local area near to the device 101. Once the peripheral devices 111 have been discovered a storage means comprising a record of one or more peripheral devices associated with the second user can be accessed. The record can be checked to identify any peripheral devices that have been discovered to be within a threshold distance of the device 101.

If any peripheral devices 111 on the record are associated with the second user and are within the threshold distance then at block 209 the method comprises enabling the use of the peripheral devices 111 associated with the second user. Enabling the use of the peripheral devices 111 associated with the second user can comprise configuring the apparatus 103 and/or device 101 to provide outputs to and/or receive inputs from the one or more peripheral devices 111 associated with the second user. The outputs and/or inputs relate to the one or more functions to which access has been enabled for the second user. Outputs and/or inputs that relate to functions to which the second user does not have access are not provided to and/or received from the peripheral device 111 associated with the second user.

The connection between the device 101 and the peripheral devices associated with the second user can be temporary. The connection between the device 101 and the peripheral devices associated with the second user can be temporary in that the connection expires after a predetermined trigger event has occurred. When the peripheral devices 111B associated with the second user are disconnected from the device 101 the outputs and/or inputs relating to the one or more functions to which access has been enabled are no longer received from and/or sent to the peripheral devices 111B associated with the second user 303.

The predetermined trigger event could be the closing of a function or application to which the second user has been enabled to access, a user input from the first user, an expiry of a time period or any other suitable type of event. Once the connection has expired it cannot be automatically re-established. That is, in order to re-establish the connection the second user would need to be authenticated again. There may be no record made indicating a connection between the peripheral devices 111 of the second user and the device 101.

In some examples a connection could be established between the device 101 and a plurality of devices 111B associated with the second user 303. These connections could be independent of each other so that one or more of the connections could be terminated while one or more other connection could remain. This could enable a first peripheral device 111B associated with a second user to be connected for a first function or application and a second different peripheral device 111B associated with a second user to be connected for a second, different function or application. In such cases if the first application is closed the connection to the first peripheral device 111B could be terminated but the connection to the second peripheral device 111B is not terminated.

FIGS. 3 to 10 show various example use cases of examples of the disclosure. Different features from the different examples can be combined as appropriate.

Figure 3:
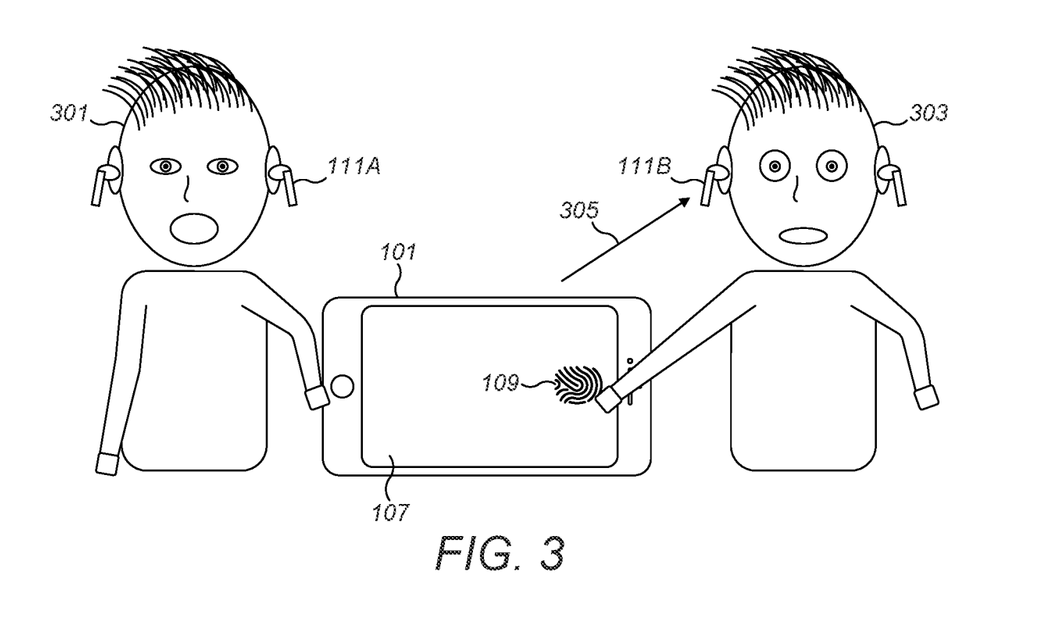
FIG. 3 shows an example device in use.

FIG. 3 shows an example device 101 in use. The device 101 could be a device as shown in FIG. 1 or could be any other suitable type of device.

In the example of FIG. 3 a first user 301 is using the device 101. In this example the first user 301 is listening to audio content using a peripheral device 111A. In this case the peripheral device 11A comprises ear buds. The earbuds can enable the first user 301 to listen to the audio content privately, that is, other people nearby can't hear the audio that the first user 301 is listening to.

The device 101 can be configured to store and/or receive the audio content that the first user is listening to and enable the audio content to be transmitted to the peripheral devices 111 for playback to the first user 301.

The first user 301 could use other types of peripheral devices 111 and/or could use the device 101 to perform other functions in other examples.

In the example scenario of FIG. 3 the first user might decide to allow the second user 303 to access the audio content. In order to enable the second user to access the audio content in a private manner the device 101 has to enable the peripheral devices 111B associated with the second user 303 to be temporarily connected to the device 101. However, the peripheral devices associated with the second user are not known to the device 101.

In examples of the disclosure the device 101 can be configured to authenticate the second user 303. In the example of FIG. 3 a sensor 109 such as a fingerprint sensor can be used to detect the fingerprint of the second user 303. The fingerprint sensors could be a capacitive sensor, an infrared sensor or any other suitable type of sensor. In some examples the sensors 109 for detecting the fingerprints could be integrated into the display 107 of the device 101.

The device 101 can authenticate the second user 303 by accessing a storage means storing fingerprint data relating to other users and determining whether or not the detected fingerprint data matches, or sufficiently matches, any of the stored fingerprint data.

Once the second user 303 has been authenticated the second user 303 can be granted permission to access one or more functions of the device 101. For example, the second user 303 could be granted permission to listen to the audio content that the first user 301 is listening to.

In order to enable the second user 303 to listen to the audio content the device 101 establishes a connection with the peripheral device 111B associated with the second user 303. In this example the peripheral device 111B comprises earbuds configured to enable the private playback of audio content. Other types of peripheral device 111B could be used in other examples of the disclosure.

The peripheral devices 111B are not known to the device 101 before the second user 303 is authenticated. The device 101 can discover the peripheral devices 111B associated with the second user 303. Any suitable protocols can be used to discover peripheral devices 111B in the area local to the device 101. Once one or more peripheral devices 111 have been discovered, the device 101 can then access a storage means comprising a record of peripheral devices 111 and their associated users to determine whether or not any peripheral devices 111B that have been discovered in the local area of the device 101 are associated with the authenticated second user 303.

If one or more peripheral devices 111B that have been discovered in the local area of the device 101 are associated with the authenticated second user 303 then a connection 305 can be established between the device 101 and the peripheral device 111B associated with the second user 303. The connection 305 can comprise a communication link. The communication link could comprise short range communication links such as Bluetooth, Bluetooth Low Energy, Bluetooth Smart, 6LoWPan (IP$_v$6 over low power personal area networks) ZigBee, ANT+, near field communication (NFC) or any suitable type of communication link or combination of communication links.

The connection 305 can enable outputs to be provided from the device 101 to the peripheral device 111B associated with the second user 303. In the example of FIG. 3 the connection can enable audio content to be provided from the device 101 to the peripheral device 111B associated with the second user 303 so as to enable the peripheral device 111B associated with the second user 303 to playback the audio content for the second user 303.

In some examples the audio content that is provided to the peripheral device 111B associated with the second user 303 could be the same as the audio content that is provided to the peripheral device 111A associated with the first user 301. This can enable the first user 301 and the second user 303 to share audio content. For instance, they could both be participating in a teleconference or other communication session.

In some examples different audio content could be provided to the peripheral device 111B associated with the second user 303 compared to the audio content provided to the peripheral device 111A associated with the first user 301. For instance, the peripheral device 111B associated with the second user 303 could only be provided with the audio content relating to the application which they have been permitted to access. In the example of FIG. 3 this would be a communications application. The peripheral device 111A associated with the first user 301 could be provided with the audio content relating to any available application of the device 101. For instance, the peripheral device 111A associated with the first user 301 could be provided with audio alerts relating to a different application to the application currently being used to provide the audio content. These alerts would not be provided to the peripheral device 111B associated with the second user 303 so that the second user 303 would not hear them. These alerts can remain private to the first user 301.

Other differences between the audio content that is provided to the peripheral device 111A associated with the first user 301 and the peripheral device 111B associated with the second user 303 could be used in other examples of the disclosure. For instance, in some examples the audio content could be provided in a different language for the different users, different volume levels could be used, different audio settings could be used and/or any other differences could be used. In some examples the respective users 301, 303 could be using the same application to listen to different content. For instance, they could both be using a media application but could be listening to different songs or other content on the application. In some examples the users 301, 303 could be accessing a chat or messaging application. In such examples only messages that are addressed to the second user 303 could be provided to the peripheral device 111B associated with the second user 303 and only messages that are addressed to the first user 301 could be provided to the peripheral device 111A associated with the first user 301.

Figure 4:
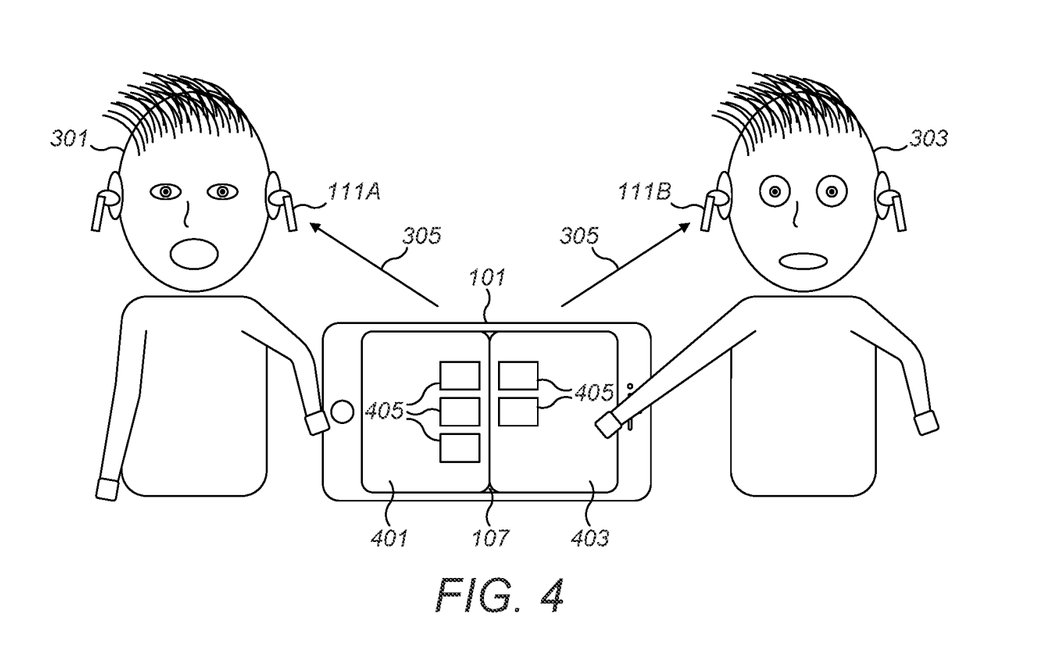
FIG. 4 shows an example device in use.

FIG. 4 shows an example device 101 in use in another scenario. The device 101 could be a device as shown in FIG. 1 or could be any other suitable type of device.

In the example of FIG. 4 a first user 301 and a second user 303 are using the device 101. The second user 303 has been authenticated by the device 101 and a connection 305 has been established between the device 101 and the peripheral device 111B associated with the second user 303. In the example of FIG. 4 the peripheral device 111B is earbuds. This can enable audio content from the device 101 to be played back by the peripheral device 111B associated with the second user 303.

In the example of FIG. 4 a connection 305 is also established with a peripheral device 111A associated with the first user 301. In the example the peripheral device 111A is earbuds. This enables audio content from the device 101 to be played back by the peripheral device 111A associated with the first user 301.

In some examples the same audio content can be provided to both the peripheral device 111A associated with the first user 301 and the peripheral device 111B associated with the second user 303. In other examples different audio content could be provided to the different peripheral devices 111. For instance, audio content, such as a notification, relating to any application of the device 101 could be provided to the peripheral device 111A associated with the first user 301 while only audio from the functions or applications for which the second user 303 has been authenticated is provided to the peripheral device 111B associated with the second user 303. This can enable audio from other applications to be played back to the first user 301 via the peripheral device 111A associated with the first user 301 but not played back to the second user 303 via the peripheral device 111B associated with the second user 303. This enables some audio content to remain private to the first user 301 and to not be shared with the second user 303.

In the example of FIG. 4 the display 107 is configured to display a user interface that enables the first user 301 and the second user 303 to control the device 101. In the example of FIG. 4 the display 107 is configured to display a first user interface 401 and a second user interface 403. The first user interface 401 is displayed on a first part of the display 107 and the second user interface 403 is displayed on a second part of the display 107. The first user interface 401 can be configured for use by the first user 301 and the second user interface 403 can be configured for use by the second user 303. In the example of FIG. 4 the first user interface 401 is displayed so that it is closer to the first user 301 and the second user interface 403 is displayed so that it is closer to the second user 303. The first user interface 401 and the second user interface 403 are displayed at the same time.

The user interfaces 401, 403 can comprise user interface elements 405. In some examples the user interface elements 405 can comprise one or more user selectable icons that can enable a user to make an input to the device 101. In some examples the user interface elements 405 can comprise information elements that are configured to display information to the users.

In the example of FIG. 4 the first user interface 401 that is provided for the first user 301 is different to the second user interface 403 that is provided for the second user 303. The differences in the respective user interfaces 401, 403 can take into account the different authorizations that the respective users 301, 303 have. For instance, the first user 301 could have authorization to access more functions of the device 101 compared to the second user 303. In such cases the first user interface 401 can comprise user interface elements 405 relating to functions which are accessible to the first user 301 but that are not accessible to the second user 303. Similarly, the second user interface 403 would only have user interface elements 405 that relate to functions which are accessible to the second user 303 and so does not have user interface elements 405 relating to the functions that are not accessible to the second user 303.

The respective user interfaces 401, 403 can comprise different numbers of user interface elements 405. In the example of FIG. 4 the first use interface 401 comprises three user interface elements 405 and the second user interface 403 comprises two user interface elements 405. Other numbers of user interface elements 405 could be used in other examples of the disclosure. In some examples all of the user interface elements 405 that are displayed on the second user interface 403 are also displayed on the first user interface 401. In some examples some of the user interface elements 405 that are displayed on the second user interface 403 might not also be displayed on the first user interface 401.

The user interface elements 405 can enable the respective users 301, 303 to control any suitable functions. For instance, in the example of FIG. 4 the users 301, 303 are using peripheral devices 111A, 111B to listen to the audio content. In such examples the user interface elements 405 could enable control of the audio content, for example it could enable users 301, 303 to control the volume or any other suitable parameters of the audio content and/or to control any other suitable function. The user interface elements 405 could enable the different peripheral devices 111A, 111B to be controlled independently of each other. For instance, the control elements 405 in the first user interface 401 could enable functions of the peripheral device 111A associated with the first user 301 to be controlled and the control elements 405 in the second user interface 403 could enable functions of the peripheral device 111B associated with the second user 303 to be controlled.

Figure 5:
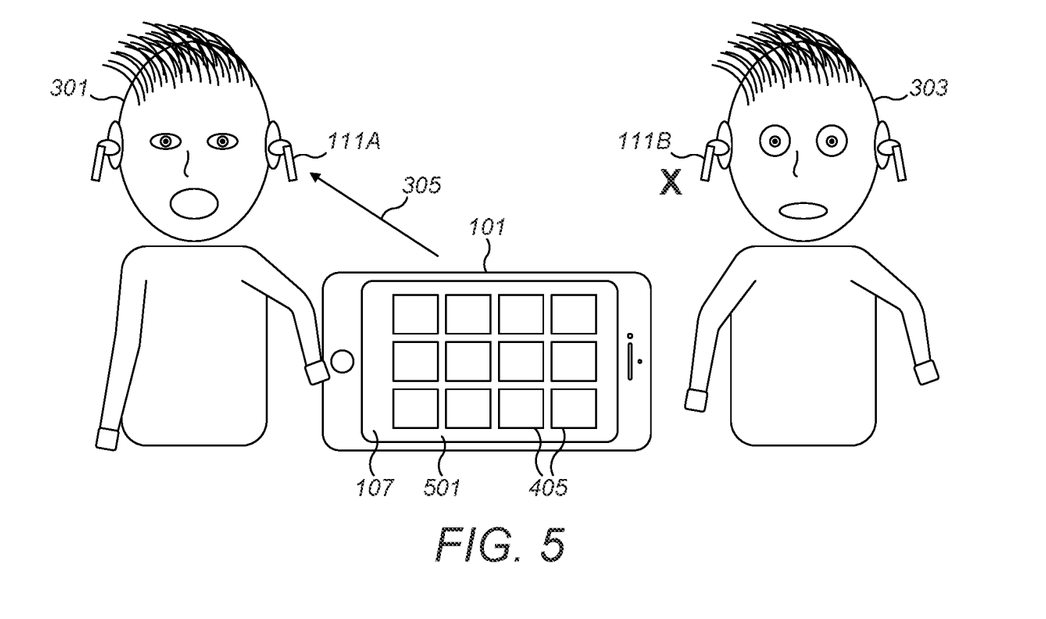
FIG. 5 shows an example device in use.

FIG. 5 shows an example device 101 in use in another scenario. The device 101 could be a device as shown in FIG. 1 or could be any other suitable type of device. In examples of the disclosure the peripheral device 111B associated with the second user 303 is temporarily connected to the device 101. The connection 305 between the device 101 and the peripheral device 111B associated with the second user 303 can be terminated in response to any suitable trigger event as shown in FIG. 5.

In the example of FIG. 5 the first user 301 has closed the application to which the second user 303 has access. This has terminated the connection 305 between the device 101 and the peripheral device 111B associated with the second user 303. The connection 305 between the peripheral device 111A associated with the first user 301 remains active and is not terminated. Therefore, when the first user 301 closes the application (or any other suitable trigger event is detected) audio content is no longer provided from the device 101 to the peripheral device 111B associated with the second user 303 but is still provided from the device to the peripheral device 111A associated with the first user 301.

Any suitable trigger event can be used to terminate the connection between the device 101 and the peripheral device 111B associated with the second user 303. For instance, the trigger event could be a user input by the first user 301, a user input by the second user 303, an expiry of a predetermined time period or any other suitable event.

After the peripheral device 111B associated with the second user 303 has been disconnected form the device the user interface that is displayed on the display 107 can also be modified. For instance, the different user interfaces 401, 403 for the different users 301, 303 can be removed and replaced with a different user interface 501 for the first user 301. This user interface 501 can occupy all of the display 107 and can comprise user interface elements 405 relating to any function and/or applications of the device 101.

Figure 6:
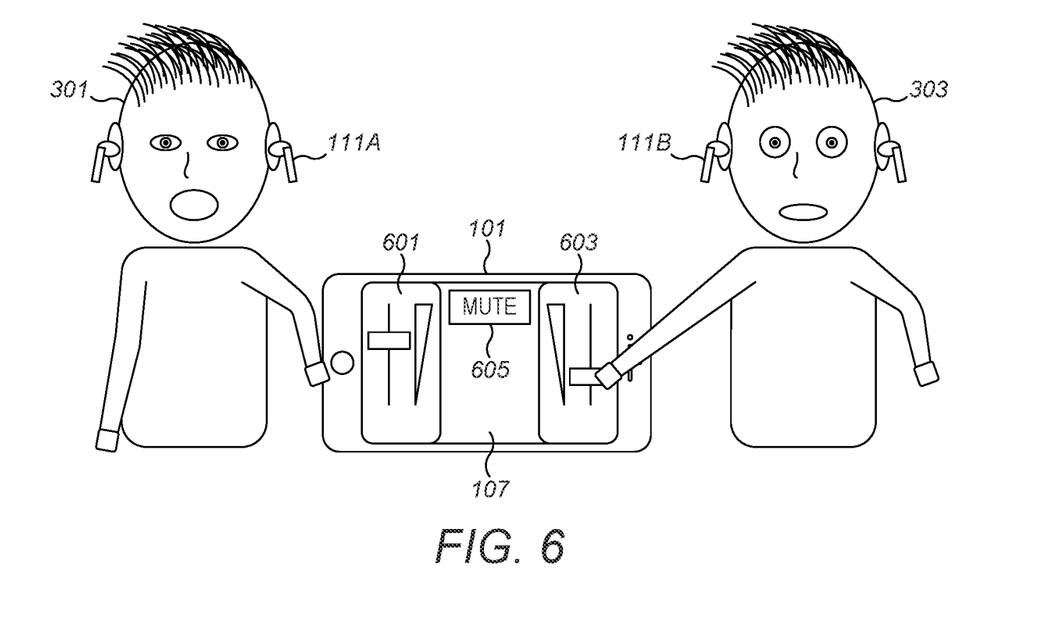
FIG. 6 shows an example device in use.

FIG. 6 shows an example device 101 in use in another scenario. The device 101 could be a device as shown in FIG. 1 or could be any other suitable type of device.

In the example of FIG. 6 a first user 301 and a second user 303 are using the device 101. The second user 303 has been authenticated by the device 101 and a connection 305 has been established between the device 101 and the peripheral device 111B associated with the second user 303. In this example the peripheral device 111B is earbuds. This can enable audio content from the device 101 to be played back by the peripheral device 111B associated with the second user 303.

In the example of FIG. 6 a connection 305 is also established with a peripheral device 111A associated with the first user 301. In this example the peripheral devices 111A is earbuds. This enables audio content from the device 101 to be played back by the peripheral device 111A associated with the first user 301.

In the example of FIG. 6 the display 107 is configured to display a user interface that enables both the first user 301 and the second user 303 to control the inputs provided to the respective peripheral devices 111A, 111B.

In the example of FIG. 6 the user interface comprises a first user interface element 601, a second user interface element 603 and a third user interface element 605. Other numbers and arrangements of interface elements could be used in other examples of the disclosure.

The first user interface element 601 is configured to enable selective control of one or more of the peripheral devices 111A that are connected to the device 101. The first user interface element 601 can control functions of a peripheral device 111A that is associated with a first user 301 but cannot be used to control functions of a peripheral device 111B that is associated with a second user 303. In this example the first user interface element 601 comprises a slider control that can be used to adjust the volume of the audio outputs provided by the peripheral device 111A associated with the first user 301.

The first user interface 601 element can be configured for use by the first user 301 In the example of FIG. 6 the first user interface element 601 is displayed so that it is closer to the first user 301.

The second user interface element 603 is also configured to enable selective control of one or more of the peripheral devices 111B that are connected to the device 101. The second user interface element 603 can enable control of different peripheral devices 111B to the first user interface element 601. In the example of FIG. 6 the second user interface element 603 can control functions of a peripheral device 111B that is associated with a second user 303 but cannot be used to control functions of a peripheral device 111A that is associated with a first user 301. In this example the second user interface element 603 comprises a slider control that can be used to adjust the volume of the audio outputs provided by the peripheral device 111B associated with the second user 303.

The second user interface 603 element can be configured for use by the second user 303. In the example of FIG. 6 the second user interface element 603 is displayed so that it is closer to the second user 303.

The third user interface element 605 is also configured to enable control of peripheral devices 111A associated with the first user 301 and also peripheral devices 111B associated with the second user 303. The third user interface element 605 In this example is a shared user interface element. The shared user interface element can be configured to enable both the first user 301 and the second user 303 to control functions of the peripheral device 111B associated with the second user 303. In this example the shared user interface element 605 also enables the second user 303 to control one or more functions of the peripheral device 111A associated with the first user 301.

In the example of FIG. 6 the third user interface element 605 comprises a selectable control that can be used to mute the audio inputs provided by both the peripheral device 111A associated with the first user 301 and the audio inputs provided by the peripheral device 111B associated with the second user 303. This could be used during teleconferencing sessions to enable the first user 301 and the second user 303 to have a private conversation that isn't transmitted to other participants in the teleconference. Other functions could be controlled by the shared user interface elements in other examples.

The third user interface 605 element can be configured for use by both the first user 301 and the second user 303. In the example of FIG. 6 the third user interface element 605 is displayed between the first user interface element 601 and the second user interface element 603 so that it can be used by both the first user 301 and the second user 303.

Other types of user interface elements 601, 603, 605 and arrangements of user interface elements 601, 603, 605 can be used in other examples of the disclosure. The type and arrangements of the respective user interface elements 601, 603, 605 might depend on the types of peripheral devices 111 that are connected to the device 101 and the functions that they are performing.

Other means could be used to enable selective control of the respective peripheral devices 111. For instance, in some examples fingerprint identification could be used to identify the respective users 301, 303 and determine which user is making a user input. In such examples the respective users 301, 303 might be required to hold their fingers on the display 107 when making a user input so as to enable identification of the respective users 301, 303.

Figure 7:
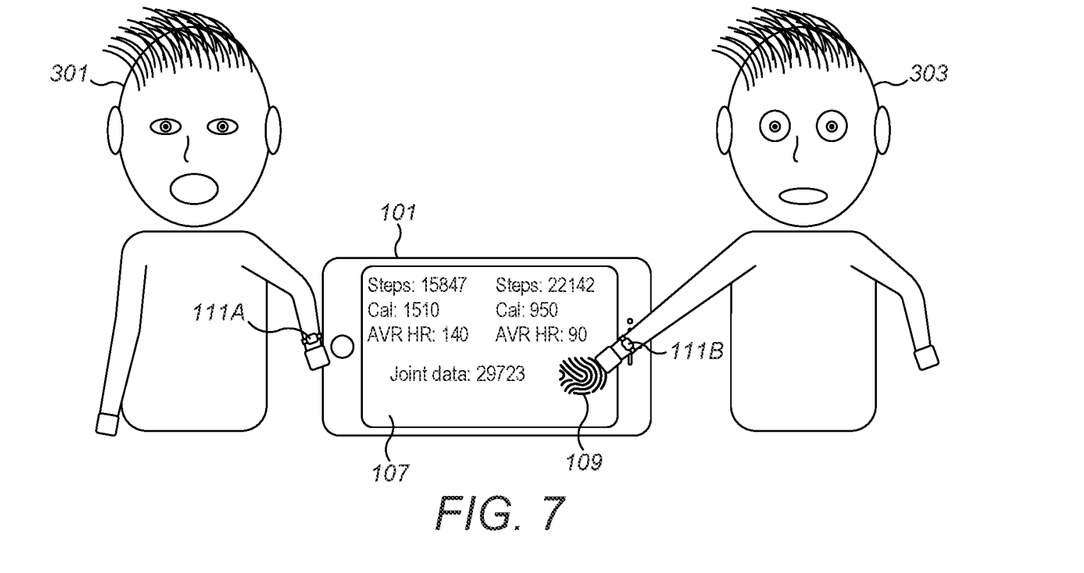
FIG. 7 shows an example device in use.

FIG. 7 shows an example device 101 providing a shared user interface in another scenario. The device 101 could be a device as shown in FIG. 1 or could be any other suitable type of device. In this example, after the second user 303 has been authenticated the device 101 is configured to enable the display of data from one or more peripheral devices 111A associated with a first user 301 and also to display data from one or more peripheral devices 111B associated with a second user 303. In some examples the data can comprise data collected by the respective peripheral devices 111. In some examples the data can comprise data relating to functions of the peripheral devices 111, for instance it could indicate volume levels, power consumptions levels or other information.

In the example of FIG. 7 the peripheral devices 111A, 111B are wearable devices. The peripheral device 111A associated with the first user 301 is worn by the first user 301 and the peripheral device 111B associated with the second user 303 is worn by the second user 303. Other types of peripheral devices 111 can be used in other examples of the disclosure.

In the example of FIG. 7 a first user 301 and a second user 303 are using the device 101. The second user 303 has been authenticated by the device 101 and a connection 305 has been established between the device 101 and the peripheral device 111B associated with the second user 303. In this example the peripheral device 111B is a health tracking device. The health tracking device can be configured to collect biometric data from the second user 303. In this example the health tracking device can collect data relating to biometric parameters such as the user's heart rate, the movement of the second user 303, energy expenditure of the second user 303 or any other suitable biometric parameter. The connection between the device 101 and the peripheral device 111B associated with the second user 303 can enable the data collected by the peripheral device 111B associated with the second user 303 to be provided to the device 101. This data can then be used by the device 101, for example the data could be analysed and/or processed and/or displayed on the display 107.

In the example of FIG. 7 a connection is also established with a peripheral device 111A associated with the first user 301. In this example the peripheral device 111A is a health tracking device configured to collect biometric data from the first user 301. The health tracking device can be configured to collect the same types of biometric data as the peripheral device 111B associated with the second user 303 and/or it could be configured to detect different types of data.

In the example of FIG. 7 the display 107 is configured to display a user interface that enables data collected by the peripheral devices 111 associated with the respective users to be displayed at the same time. In this example data collected by the peripheral device 111A associated with the first user 301 is displayed on a first portion of the display 107 and data collected by the peripheral device 111B associated with the second user 303 is displayed on a second portion of the display 107. The data collected by the respective peripheral devices 111A, 111B can be displayed at the same time. This can enable the data collected by the respective peripheral devices 111A, 111B to be compared.

In the example of FIG. 7 the data collected by the respective peripheral devices 111A, 111B and displayed by the display comprises number of steps, energy consumption and heart rate data.

In some examples some of the data collected by the peripheral devices 111A, 111B can be combined or otherwise processed together. For instance, in the example of FIG. 7 the total number of steps from the first user 301 and the second user 303 are combined to give a combined total. Other combinations of other types of data could be used in other examples.

Figure 8:
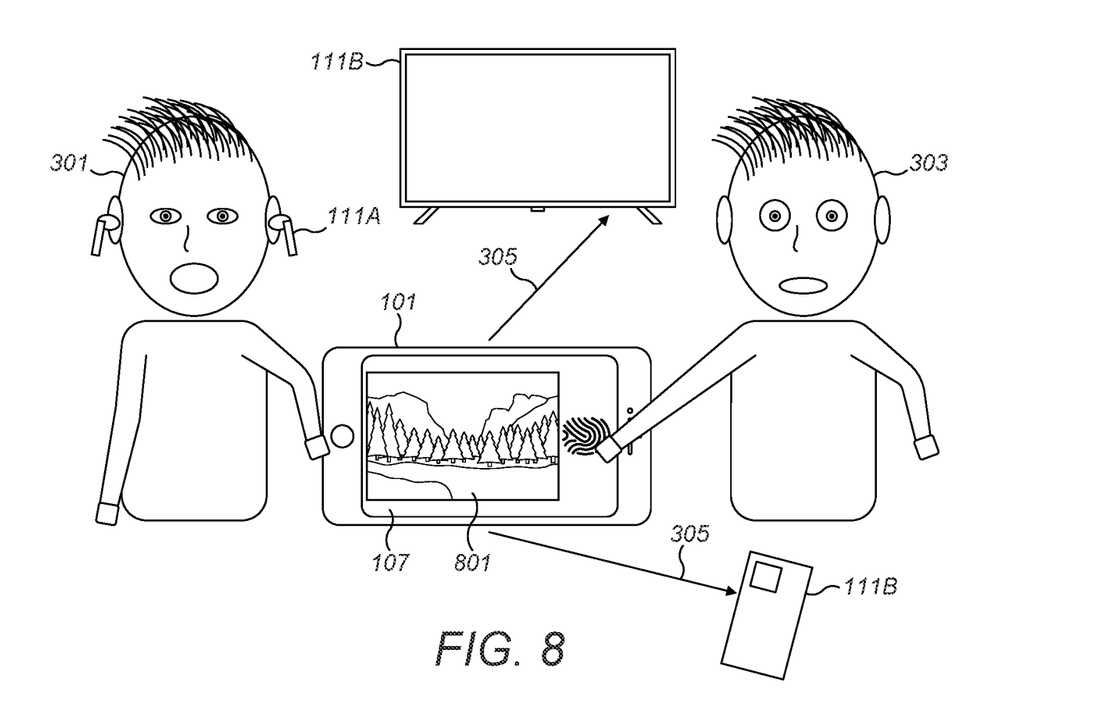
FIG. 8 shows an example device in use.

FIG. 8 shows an example device 101 that enables a user 301, 303 to select between different peripheral devices 111B associated with the second user 303. The device 101 could be a device as shown in FIG. 1 or could be any other suitable type of device.

In the example of FIG. 8 there are two peripheral devices 111B associated with the second user 303 and in proximity of the device 101. Such a situation could arise if the first user 301 has visited the home of the second user 303. In such cases the second user 303 can have peripheral devices 111B within their home that are suitable for establishing a connection with the device 101.

In the example of FIG. 8 two peripheral devices 111B associated with the second user 303 are shown. Any number of peripheral devices 111B associated with the second user 303 could be in the area around the device 101 in other examples of the disclosure.

In the example of FIG. 8 a first peripheral device 111B associated with the second user 303 is a television and the second peripheral device 111B associated with the second user 303 is a mobile phone. Other types of peripheral devices could be used in other examples.

In the example of FIG. 8 the first user 301 has content 801 that they want to share with the second user 303 by displaying on a peripheral device 111B associated with the second user 303. In order to enable the sharing of the content the second user 303 is authenticated by the device 101. In the example of FIG. 8 fingerprint recognition is used to authenticate the second user 303. Once the second use 303 has been authenticated the device 101 can discover the peripheral devices 111B that are associated with the second user 303 and that are within a threshold distance to the device 101. In this example the device 101 will detect the television and the mobile phone.

In some examples the device 101 could establish a connection with both the television and the mobile phone. In some examples the device 101 can enable a user to select which of the discovered peripheral devices are connected to the device 101. For instance, a user interface element could be displayed on the display 107 that enables a user to indicate a selection of the peripheral device 111 that is to be used. Once the peripheral device 111B that is to be used has been selected the content 801 from the device 101 can be provided to the selected peripheral device via the connection 305.

In the example of FIG. 8 the content 801 comprises images. The images could be video images or still images. The images could be displayed on the screen of the television or the screen of the mobile phone in dependence upon the selection of the peripheral device 111B that is made by the users. Other types of content and/or combinations of content could be used in other examples of the disclosure.

When the content 801 has finished, or in response to any other suitable trigger event, the connection 305 can be terminated and the peripheral device associated with the second user 303 can be forgotten by the device 101.

Figure 9:
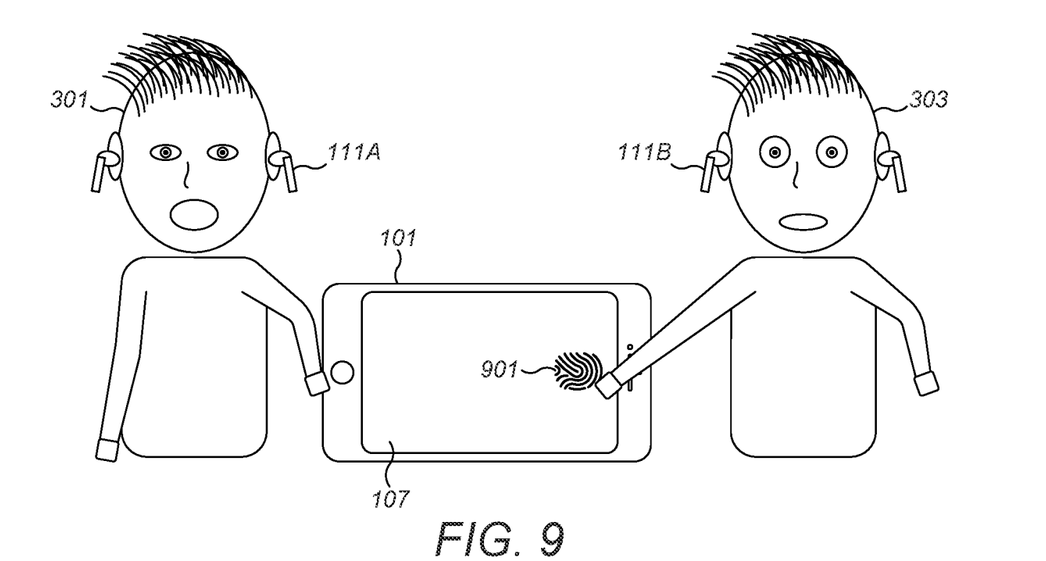
FIG. 9 shows an example device in use.

FIG. 9 shows an example device 101 in use in a scenario in which the peripheral devices 111 in proximity to the device 101 can be used to aid the authentication of the second user.

In this example the device 101 is configured to use fingerprint recognition to authenticate the second user 303. Other parameters or characteristics could be used in other examples of the disclosure.

In this example the fingerprint 901 is not fully recognized or is not recognized with sufficient accuracy. In this case a storage means comprising a record of the fingerprint data can be accessed. The record can be used to find a best candidate match for the fingerprint data. The device 101 can then see if there are any peripheral devices 111 near the device 101 that are associated with the best candidate match. If there are peripheral devices 111 that are associated with the best candidate match then it can be assumed that the best candidate match is correct and the second user 303 can be authenticated. If there are no peripheral devices 111 that are associated with the best candidate match then it can be assumed that the best candidate match is not correct and the second user 303 is not authenticated.

Information relating to the users associated with peripheral devices 111 near the device 101 can also be used to aid the authentication of the second user 303 in other examples. For instance, when the device 101 accesses the storage means comprising the record of users and the associated devices, a shortlist of the users associated with nearby peripheral devices can be used. This detected identification characteristics from the device can then be compared to the users in the shortlist rather than all of the users in the record. This can make the authentication of the second user 303 faster and more reliable.

FIG. 10 schematically illustrates an apparatus 103 that can be used to implement examples of the disclosure. In this example the apparatus 103 comprises a controller 1001. The controller 1001 can be a chip or a chip-set. In some examples the controller can be provided within a communications device or any other suitable type of device.

In the example of FIG. 10 the implementation of the controller 1001 can be as controller circuitry. In some examples the controller 1001 can be implemented in hardware alone, have certain aspects in software including firmware alone or can be a combination of hardware and software (including firmware).

As illustrated in FIG. 10 the controller 1001 can be implemented using instructions that enable hardware functionality, for example, by using executable instructions of a computer program 1007 in a general-purpose or special-purpose processor 1003 that can be stored on a computer readable storage medium (disk, memory etc.) to be executed by such a processor 1003.

The processor 1003 is configured to read from and write to the memory 1005. The processor 1003 can also comprise an output interface via which data and/or commands are output by the processor 1003 and an input interface via which data and/or commands are input to the processor 1003.

The memory 1005 is configured to store a computer program 1007 comprising computer program instructions (computer program code 1009) that controls the operation of the controller 1001 when loaded into the processor 1003. The computer program instructions, of the computer program 1007, provide the logic and routines that enables the controller 1001 to perform the methods illustrated in FIG. 2 The processor 1003 by reading the memory 1005 is able to load and execute the computer program 1007.

The apparatus 103 therefore comprises: at least one processor 1003; and at least one memory 1005 including computer program code 1009, the at least one memory 1005 storing instructions 1009 that, when executed by the at least one processor 1003, cause the apparatus 103 at least to perform:
  enabling a first user to access one or more applications of a device;
  authenticating a second user;
  enabling the second user to access one or more functions of at least one application;
  detecting one or more peripheral devices associated with the second user; and
  configuring the apparatus to provide outputs to and/or receive inputs from the one or more peripheral devices associated with the second user wherein the outputs and/or inputs relate to the one or more functions to which access has been enabled for the second user.

As illustrated in FIG. 10 the computer program 1007 can arrive at the controller 1001 via any suitable delivery mechanism 1011. The delivery mechanism 1011 can be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 1007. The delivery mechanism can be a signal configured to reliably transfer the computer program 1007. The controller 1001 can propagate or transmit the computer program 1007 as a computer data signal. In some examples the computer program 1007 can be transmitted to the controller 1001 using a wireless protocol such as Bluetooth, Bluetooth Low Energy, Bluetooth Smart, 6LoWPan ($IP_v6$ over low power personal area networks) ZigBee, ANT+, near field communication (NFC), Radio frequency identification, wireless local area network (wireless LAN) or any other suitable protocol.

The computer program 1007 comprises computer program instructions for causing an apparatus 103 to perform at least the following:
  enabling a first user to access one or more applications of a device;
  authenticating a second user;
  enabling the second user to access one or more functions of at least one application;
  detecting one or more peripheral devices associated with the second user; and
  configuring the apparatus to provide outputs to and/or receive inputs from the one or more peripheral devices associated with the second user wherein the outputs and/or inputs relate to the one or more functions to which access has been enabled for the second user.

The computer program instructions can be comprised in a computer program 1007, a non-transitory computer readable medium, a computer program product, a machine readable medium. In some but not necessarily all examples, the computer program instructions can be distributed over more than one computer program 1007.

Although the memory 1005 is illustrated as a single component/circuitry it can be implemented as one or more separate components/circuitry some or all of which can be integrated/removable and/or can provide permanent/semi-permanent/dynamic/cached storage.

Although the processor 1003 is illustrated as a single component/circuitry it can be implemented as one or more separate components/circuitry some or all of which can be integrated/removable. The processor 1003 can be a single core or multi-core processor.

References to "computer-readable storage medium", "computer program product", "tangibly embodied computer program" etc. or a "controller", "computer", "processor" etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term "circuitry" can refer to one or more or all of the following:
(a) hardware-only circuitry implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions and
(c) hardware circuit(s) and or processor(s), such as a microprocessor(s) or a portion of a microprocessor(s), that requires software (e.g. firmware) for operation, but the software can not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The apparatus 103 as shown in FIG. 10 can be provided within any suitable device. In some examples the apparatus 103 can be provided within an electronic device such as a mobile telephone, a teleconferencing device, a camera, a computing device or any other suitable device. In some examples the apparatus is the device 101 or is an electronic device such as a mobile telephone, a teleconferencing device, a camera, a computing device or any other suitable device.

The blocks illustrated in FIG. 2 can represent steps in a method and/or sections of code in the computer program 1007. The illustration of a particular order to the blocks does not necessarily imply that there is a required or preferred order for the blocks and the order and arrangement of the blocks can be varied. Furthermore, it can be possible for some blocks to be omitted.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example. Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

The invention claimed is:

1. A device comprising:
   at least one processor; and
   at least one memory storing instructions that, when executed by the at least one processor, cause the device at least to:
   grant a first user access to one or more applications of the device, wherein the first user is associated with a first plurality of peripheral devices;
   authenticate a second user;
   grant the second user access to one or more functions of at least one application;
   detect a second plurality of peripheral devices associated with the second user; and
   provide one or more outputs to, or receive one or more inputs from, the second plurality of peripheral devices associated with the second user, wherein the one or more outputs or one or more inputs relate to the one or more functions to which access has been granted for the second user.

2. The device as claimed in claim 1 wherein detecting the second plurality of peripheral devices associated with a second user comprises:
   accessing a storage of the device comprising a record of peripheral devices associated with the second user; and
   identifying a subset of the record of peripheral devices that are within a threshold distance of the device.

3. The device as claimed in claim 1, wherein the second plurality of peripheral devices comprises at least a health tracking device, and wherein the device is further caused to:
   authenticate the second user using one or more biometric parameters of the second user collected by the health tracking device.

4. The device as claimed in claim 1 wherein the first user is authorized to access any of the one or more applications of the device and the second user is authorized to access a subset of the one or more applications of the device.

5. The device as claimed in claim 1 wherein the at least one memory and the instructions stored therein are configured to, with the at least one processor, further cause the device to:
   grant to the first user access to a first application and a second application of the one or more applications of the device and, after the second user has been authenticated, grant the second user access to the first application but not to access the second application, based on an indication provided by the first user of which of the one or more applications the second user is able to be authorized to access.

6. The device as claimed in claim 1 wherein the at least one memory and the instructions stored therein are configured to, with the at least one processor, further cause the device to:
   responsive to authentication of the second user, provide a first user interface for the first user on a first part of a display and a second, different user interface for the second user on a second part of the display, wherein the first part of the display is closer to the first user and the second part of the display is closer to the second user.

7. The device as claimed in claim 6 wherein the first user interface comprises one or more user interface elements configured to control the first plurality of peripheral devices and the second user interface comprises one or more user interface elements configured to control the second plurality of peripheral devices.

8. The device as claimed in claim 6 wherein the at least one memory and the instructions stored therein are configured to, with the at least one processor, further cause the device to: after the second user has been authenticated, provide one or more shared user interface elements on the first part of the display and the second part of the display, wherein the one or more shared user interface elements are configured to enable simultaneous control of the first plurality of peripheral devices and the second plurality of peripheral devices.

9. The device as claimed in claim 8 wherein the at least one memory and the instructions stored therein are configured to, with the at least one processor, further cause the device to: after the second user has been authenticated, display data from the first plurality of peripheral devices on the first part of the display and display data from the second plurality of peripheral devices on the second part of the display.

10. The device as claimed in claim 8, wherein the one or more of the plurality of peripheral devices associated with the second user comprises at least a first pair of earbuds and the one or more of the plurality of peripheral devices associated with the first user comprises at least a second pair of earbuds, wherein the first pair of earbuds and the second pair of earbuds enable receiving audio output from the device and providing audio input to the device, wherein the one or more user interface elements of the first interface comprises at least a volume control element to control a volume of the received audio output from the device, and wherein the one or more shared user interface elements comprise a mute element that enables muting of the provided audio input to the device from the first pair of earbuds and the second pair of earbuds.

11. The device as claimed in claim 1 wherein the at least one memory and the instructions stored therein are configured to, with the at least one processor, further cause the device to: after the second user has been authenticated and in response to a user input from the second user, select a peripheral device of the second plurality of peripheral devices to be connected to the device.

12. The device as claimed in claim 1 wherein the at least one memory and the instructions stored therein are configured to, with the at least one processor, further cause the device to: after the second user has been authenticated, and in response to the at least one application being closed, disconnect the second plurality of peripheral devices from the device.

13. The device as claimed in claim 1 wherein the device comprises at least one of: a telephone, a camera, a computing device or a teleconferencing device.

14. The device according to claim 1, wherein the device further comprises a display.

15. A method comprising:
   granting a first user access to one or more applications of a device, wherein the first user is associated with a first plurality of peripheral devices;
   authenticating a second user;
   granting the second user access to one or more functions of at least one application;

detecting a second plurality of peripheral devices associated with the second user; and providing one or more outputs to, or receiving one or more inputs from, the second plurality of peripheral devices associated with the second user, wherein the one or more outputs or one or more inputs relate to the one or more functions to which access has been granted for the second user.

16. The method of claim 15, further comprising:

responsive to authentication of the second user providing a first user interface for the first user on a first part of a display and a second, different user interface for the second user on a second part of the display, wherein the first part of the display is closer to the first user and the second part of the display is closer to the second user.

17. The method of claim 16, wherein the first user interface comprises one or more user interface elements configured to control the first plurality of peripheral devices and the second user interface comprises one or more user interface elements configured to control the second plurality of peripheral devices.

18. A non-transitory computer readable medium comprising program instructions stored thereon for causing a device to perform at least the following: granting a first user access to one or more applications of the device, wherein the first user is associated with a first plurality of peripheral devices;

authenticating a second user;

granting the second user access to one or more functions of at least one application;

detecting a second plurality of peripheral devices associated with the second user; and providing one or more outputs to, or receiving one or more inputs from, the second plurality of peripheral devices associated with the second user, wherein the one or more outputs or one or more inputs relate to the one or more functions to which access has been granted for the second user.

19. The non-transitory computer readable medium of claim 18, wherein the device is further caused to perform:

responsive to authentication of the second user, providing a first user interface for the first user on a first part of a display and a second, different user interface for the second user on a second part of the display, wherein the first part of the display is closer to the first user and the second part of the display is closer to the second user.

\* \* \* \* \*